May 31, 1932.  A. LANG  1,860,507
ANIMAL TRAP
Filed Aug. 3, 1928  2 Sheets-Sheet 2
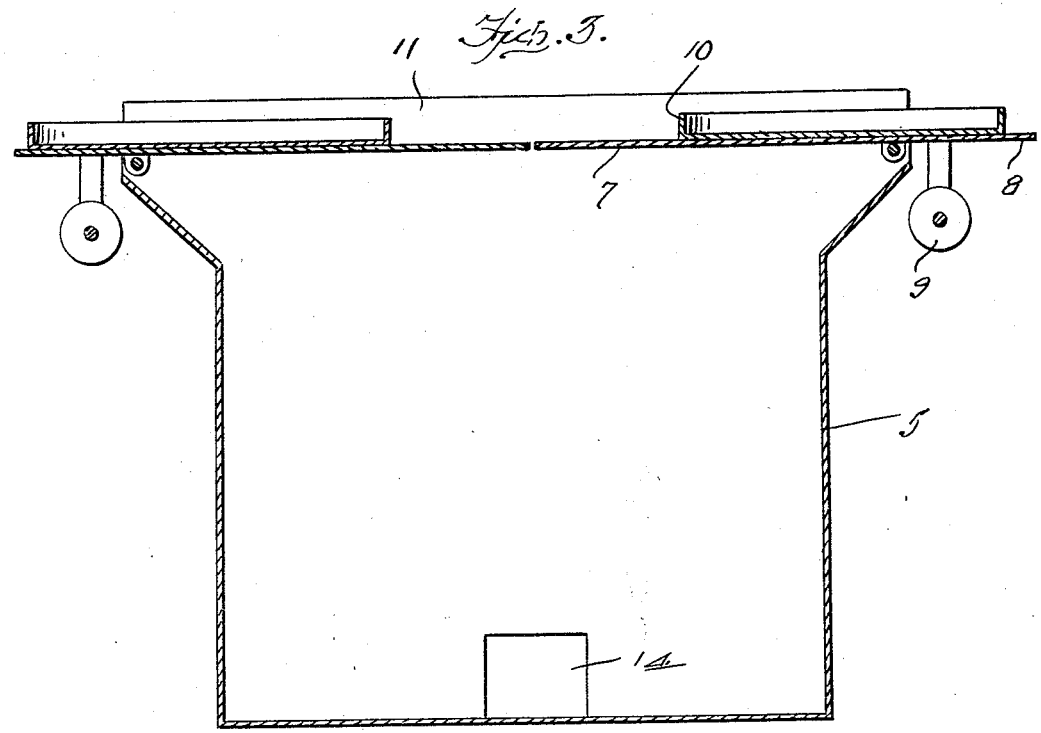
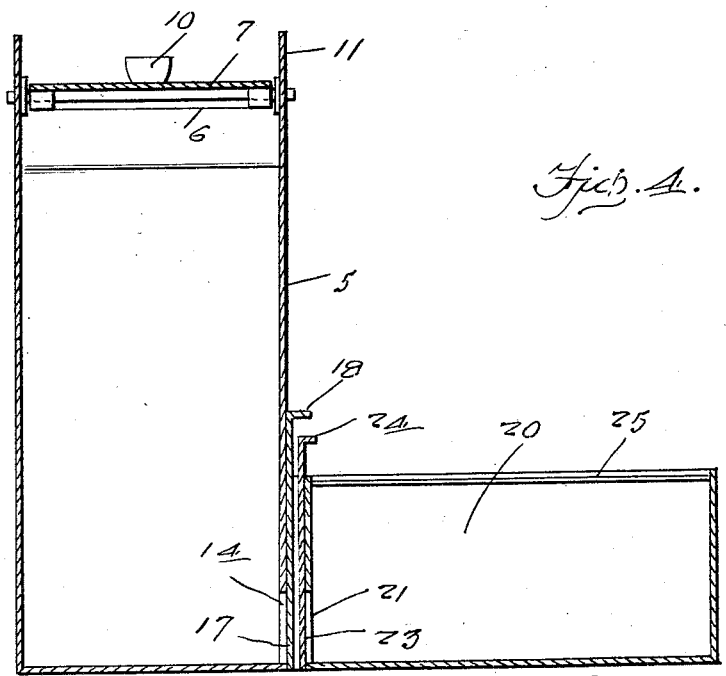
Inventor
Andrew Lang
By Clarence A. O'Brien
Attorney Patented May 31, 1932

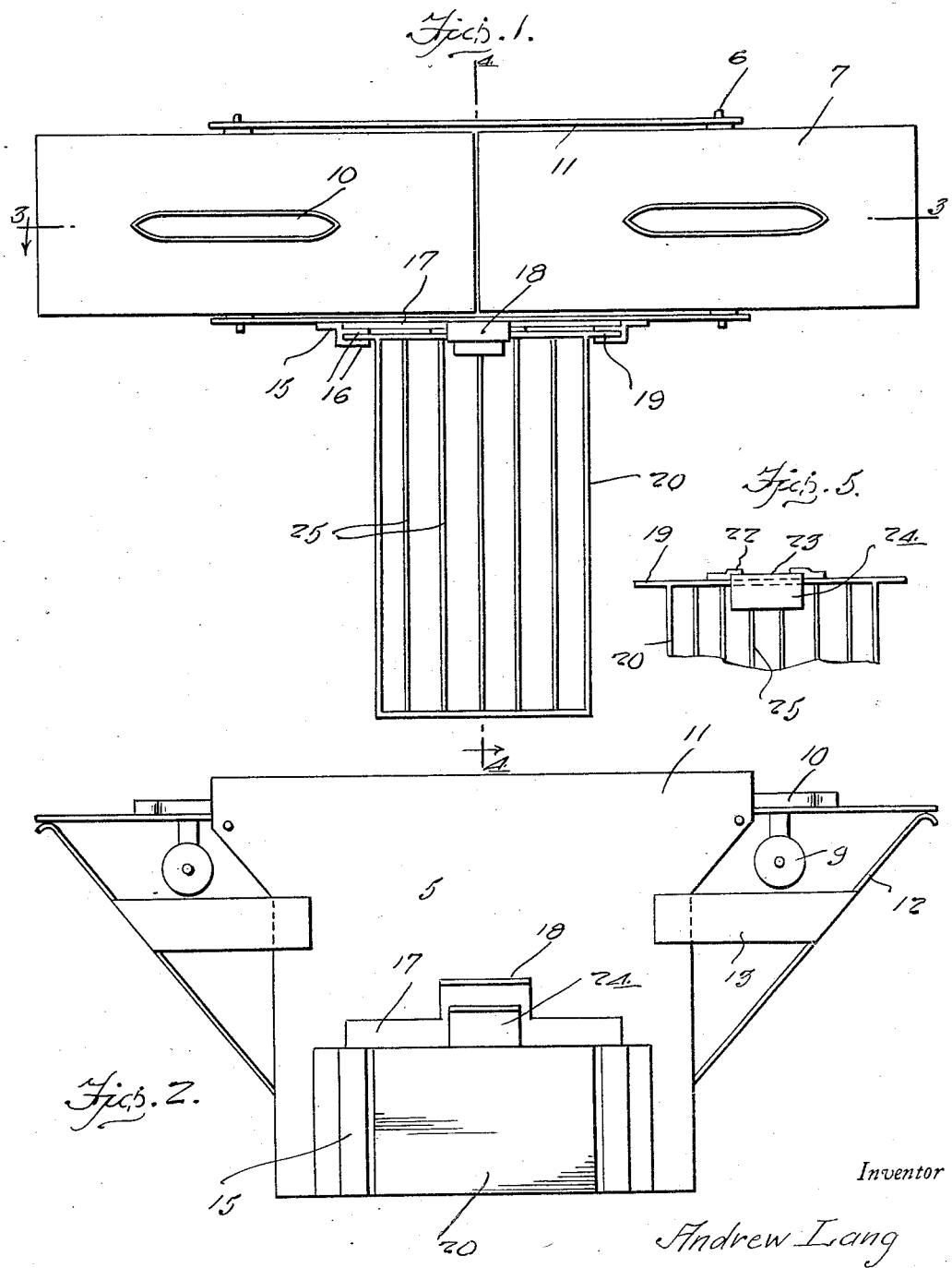

1,860,507

UNITED STATES PATENT OFFICE

ANDREW LANG, OF MOBRIDGE, SOUTH DAKOTA

ANIMAL TRAP

Application filed August 3, 1928. Serial No. 297,305.

The present invention relates to animal traps and more particularly to mouse and rat traps of a type provided with a tilting platform and has for its principal object to provide means for detachably securing the trap compartment in communication with the opening provided in the trap for emptying the same and through the use of the detachable compartment to provide means for removing the animals from the trap and destroying the same without necessitating the hands of the person coming in contact with the animals.

A further object of the invention is to provide a trap of this character which is continuously maintained in use while the animals previously caught by the trap are being removed therefrom and destroyed.

Another object is to provide a device of this character of a simple and practical construction, which is efficient and reliable in performance, relatively inexpensive to manufacture and otherwise well adapted for the purpose for which it is designed.

Other objects and advantages reside in the special construction, combination and arrangement of the various elements forming the invention as more fully hereinafter described and claimed, reference being had to the accompanying drawings forming part hereof, wherein like numerals refer to like parts throughout and in which:

In the drawings:

Figure 1 is a top plan view,

Figure 2 is a side elevational view looking at the side of the trap to which the animal removing compartment is attached.

Figure 3 is a longitudinal sectional view,

Figure 4 is a vertical transverse sectional view taken along a line 4—4 of Figure 1, and Figure 5 is a fragmentary top plan view of the attaching end of the compartment provided for removing the animals from the trap.

Referring now to the drawings, the invention comprises an animal trap compartment 5 having its upper end open and provided with a pair of transversely extending shafts 6 journaled for rotation adjacent the sides of the trap and upon each of which is secured a tilting platform 7.

The inner ends of the platforms at the opposite edges of the trap are disposed in close proximity to each other as illustrated in Figure 1 of the drawings and their outer ends as shown at 8 extend outwardly beyond the opposite side edges of the trap.

To the outwardly projecting ends 8 is suspended a weight 9 to normally maintain the platform in horizontal position, and the upper surface of each platform 7 is provided with a drink trough or receptacle 10 fixedly secured to the surface thereof.

The side edges of the trap 5 extend upwardly above the platform 7 as indicated at 11 so that the animals upon approaching the trap and moving along the platform from either end thereof will be guided toward the center of the trap.

The outer protruding edges of the platforms are engaged at their upper sides by a brace 12 extending upwardly and outwardly from the opposite ends of the trap for preventing the downward movement of the outer ends of the platforms beyond a horizontal plane by the action of the weights 9. The upper free end of each brace 12 is secured in a rigid position by side brace members 13 which extend from the brace 12 for attachment to the sides of the trap.

Adjacent the bottom edge, at one side of the trap is formed an opening 14 by means of which the animals caught in the trap may be removed therefrom. A pair of double guide members 15 are secured to the outer side of the trap at the opposite sides of the opening 14, each of said guide members being provided with a pair of spaced parallel guide plates 16 extending in a direction toward the opening and the innermost of said guide plates are disposed in outwardly spaced relation from the side of the trap.

A vertically sliding door 17 is disposed between the innermost guide plates 16 and the sides of the trap with its upper edge provided with a handle 18 by means of which the door may be raised whereby to control communication through the opening 14. Between the inner and outer guide plates 16 are slidably fitted flanges 19 formed at the sides of a container 20 at one end thereof.

The end of the container provided with the flanges 19 is also provided with an opening 21 adjacent its lower edge and adapted to register with the opening 14 of the trap when the flanges 19 of the container are fitted between the guide plates 16. A pair of guides 22 are also secured to the outer surface of the end of the container at opposite sides of the opening 21 and serve to slidably retain the door 23 in opening and closing position with respect to the opening 21.

The door 23 is also provided in its upper edge with a handle 24 for raising the door into open position. It will be apparent that when the container 20 is attached in position to the side of the trap as illustrated in Figure 1 of the drawings, that upon the opening of the doors 17 and 23 the animals from the trap 5 may pass through the openings 14 and 21 into the container 20.

The top of the container 20 is open and provided with a series of closely connected rods 25 to prevent the escape of the animal from the upper portion of the container. By reason of the open construction of the top of the container a free inspection of the interior of the container is permitted and as soon as the animals in the trap have entered the container 20, the doors 17 and 23 may then be closed and the container 20 is removed from the trap to permit the animals to be destroyed.

By reason of this construction the removal of the animals in the container 20 does not interfere with the continued operation of the trap. Furthermore it is not necessary that the hands of persons come into contact with the animals at the time the same are being removed from the trap to the container.

It is obvious that my invention is susceptible to various changes and modifications in construction without departing from the spirit of the invention or the scope of the appended claim, and I accordingly claim all such forms of the device to which I am entitled.

Having thus described my invention, what I claim as new is:

A trap of the class described comprising a casing having an open top with its sides extending above the top and its ends having inwardly extending parts, a shaft extending through the outer portion of each of said parts and supported by the sides of the trap, a pair of platforms supported by said shaft and extending between the extended parts of the sides with their outer ends projecting beyond the ends of the trap, weights suspended from said outer ends and an upwardly and outwardly extending member at each end of the trap, the upper ends of said members forming rests for the outer ends of the platform for limiting the downward movement of said outer ends and for normally holding the platforms in horizontal position.

In testimony whereof I affix my signature.

ANDREW LANG.